United States Patent [19]

Shaw

[11] Patent Number: 4,495,778
[45] Date of Patent: Jan. 29, 1985

[54] TEMPERATURE AND PRESSURE ACTUATED CAPACITY CONTROL SYSTEM FOR AIR CONDITIONING SYSTEM

[75] Inventor: David N. Shaw, Unionville, Conn.

[73] Assignee: Dunham-Bush, Inc., West Hartford, Conn.

[21] Appl. No.: 580,047

[22] Filed: Feb. 14, 1984

[51] Int. Cl.³ .............................................. F25B 1/00
[52] U.S. Cl. .................................... 62/209; 62/228.3; 62/228.5
[58] Field of Search ............. 236/1 EA; 62/175, 209, 62/228.5, 203, 228.3

[56] References Cited

U.S. PATENT DOCUMENTS 4,151,725  5/1979  Kountz et al. ...................... 62/228.5
4,384,462  5/1983  Overman et al. ...................... 62/175

Primary Examiner—William E. Wayner
Attorney, Agent, or Firm—Sughrue, Mion, Zinn, Macpeak, and Seas

[57] ABSTRACT

An air conditioning control system, for use with an air conditioning system having a variable-capacity compressor, varies the compressor loading in accordance with evaporator pressure at return air temperatures above an upper set point and fixes the compressor loading at 33% or thereabouts when the return air temperature falls below the upper set point. If the temperature continues to fall, the compressor will be shut down at a lower set point at which the heating apparatus may be automatically and momentarily activated. The compressor will not again be activated until the temperature rises above the upper set point. The heating is deactivated as soon as the temperature rises above the lower set point.

12 Claims, 6 Drawing Figures

TEMPERATURE CONTROL CHART

TEMPERATURE AND PRESSURE ACTUATED CAPACITY CONTROL SYSTEM FOR AIR CONDITIONING SYSTEM

BACKGROUND

The present invention is directed to air conditioning system control, and is more particularly directed to a control system which is both temperature and pressure actuated. The invention is particularly suitable for use in air conditioning systems in motor vehicles, and will described in that context, but it should be appreciated that the control system could be used in other air conditioning systems as well.

It is known to use variable capacity compressors in bus air conditioning systems wherein the compressor can be progressively unloaded as engine rpm increases in an attempt to optimize the capacity/power curve. With typical reciprocating compressors, however, unloading is accomplished by removing cylinders from service, and progressive unloading of cylinders results in vibration. Accordingly, many conventional bus air conditioning systems have operated with the compressor either fully loaded or off.

In a typical operating cycle for a combined heating-/air conditioning system, two different thermostats will be used to set upper and lower set point temperatures. When the return air temperature is below the lower set point temperature (e.g. 68° F.), the heating system will be activated and the blower will be operated at low speed. When the temperature rises above the lower set point temperature, the heating system will be deactivated but the blower will continue to operate for venting operation. If the return air temperature rises above the upper set point temperature (e.g. 72° F.), the air conditioning system will be activated with the compressor operating at full load and the blower operating at high speed. If the temperature falls below the upper set point temperature, the air conditioning system will continue to operate at full capacity, but the heating system will also be activated to reheat the air after it passes the evaporator. This simultaneous operation of the air conditioning and heating system is for the purpose of obtaining a desired degree of dehumidification and avoidance of clutch cycling. When the temperature falls below the lower set point temperature, the air conditioning system will be disabled and the heating system will again be enabled. However, once the compressor has been activated, it is unlikely that it will shut off, since the heating capacity exceeds the cooling capacity.

Examples of such an air conditioning control system as described above are the automatic preset temperature control system available from Vapor Transportation Systems of Chicago, Ill., and the pneumatic control systems currently used in many GMC busses.

A problem with the typical system described above is that, without the reheating mode of operation described above, an excessive amount of "off" time may elapse between the time at which the compressor is disengaged when the temperature falls below 68° F. and time at which the compressor is re-engaged when the temperature rises above the upper set point temperature of 72° F. During this off cycle, the evaporator coil tends to warm-up significantly, and no further moisture removal is obtained. In fact, the moisture which has collected on the evaporator coil may be reevaporatored. Further, the on/off cycling of the compressor results in an excessive amount of wear and tear on the compressor clutch.

With reheating, on the other hand, the system operates at design capacity at all times with the heating system adding enough heat to keep the temperature above the lower set point. Excessive energy is wasted in having the compressor remove not only the normal heat build-up in the bus but also that added by the heating system.

U.S. Pat. No,. 4,388,048, assigned to the assignee of the present application, discloses an improved variable capacity compressor. Copending and commonly assigned application Ser. No. 421,191 discloses a control system for the compressor in which the compressor is operated at 33%, 66% or 100% load depending on the monitored temperature of the return air. The capacity dictated by the return air temperature can be increased or decreased in accordance with other sensed parameters such as relative humidity, evaporator coil temperature, etc. The disclosures of both U.S. Pat. No. 4,388,048 and U.S. patent application Ser. No. 421,191 are incorporated herein by reference.

While the compressor and control system described in the above references represent a significant improvement in air conditioning systems, "reheat"-type heating-/air conditioning systems still operate in the manner described above, with the air conditioning compressor continuing to operate at full load while the heating system is simultaneously operated as the return air temperature decreases from the upper set point temperature to the lower set point temperature.

It would be desirable, therefore, to provide a more effective means for obtaining desired dehumidification at temperatures between the upper and lower set points. It would be further desirable to obtain this dehumidification while decreasing the energy consumption of the system and also minimizing the strain on the compressor clutch.

SUMMARY OF THE INVENTION

It is an object of this invention to provide an air conditioning control system which more effectively maintains dehumidification between the upper and lower set point temperatures while simultaneously minimizing power consumption and decreasing the strain on the compressor clutch.

With the control system according to the present invention, the heating system will be enabled at temperatures below the lower set point, with a possible venting operation being employed when the temperature rises above the lower set point. When the temperature rises above the upper set point, the compressor will be permitted to load to 100% percent, and the loading of the compressor will be varied as the evaporator pressure, or compressor suction pressure, rises and falls. When the temperature falls below the upper set point, the compressor will be automatically unloaded to a 33% load level regardless of the evaporator pressure, and the heating system will not be activated until the temperature falls below the lower set point.

In the preferred embodiment, the upper and lower set point temperatures are 72° F. and 68° F., respectively, and the cooling thermostat (determining the upper set point) and heating thermostat (determining the lower set point) are each closed at temperatures above their respective set points. When the heating thermostat is opened below 68° F., the heating system will be on, and when the cooling thermostat is closed above 72° F., the cooling system will be on. In the temperature band between the upper and lower set points, the cooling system may or may not be on, with the cooling system being activated only when the temperature rises above the upper set point and being de-activated only when the temperature falls below the lower set point. A compressor load relay is energized when the cooling thermostat is closed above 72° F., to thereby enable load control circuitry which will allow adjustment of the loading of the compressor, e.g. between 33%, 66% and 100%, in accordance with the evaporator pressure. When the return air temperature falls below 72° F., the cooling thermostat opens and the compressor load relay is de-energized, thereby fixing the compressor at 33% load regardless of the evaporator pressure.

BRIEF DESCRIPTION OF THE DRAWINGS

The invention will be more clearly understood from the following description in conjunction with the accompanying drawings, wherein.

DETAILED DESCRIPTION OF THE INVENTION

Figure 1:
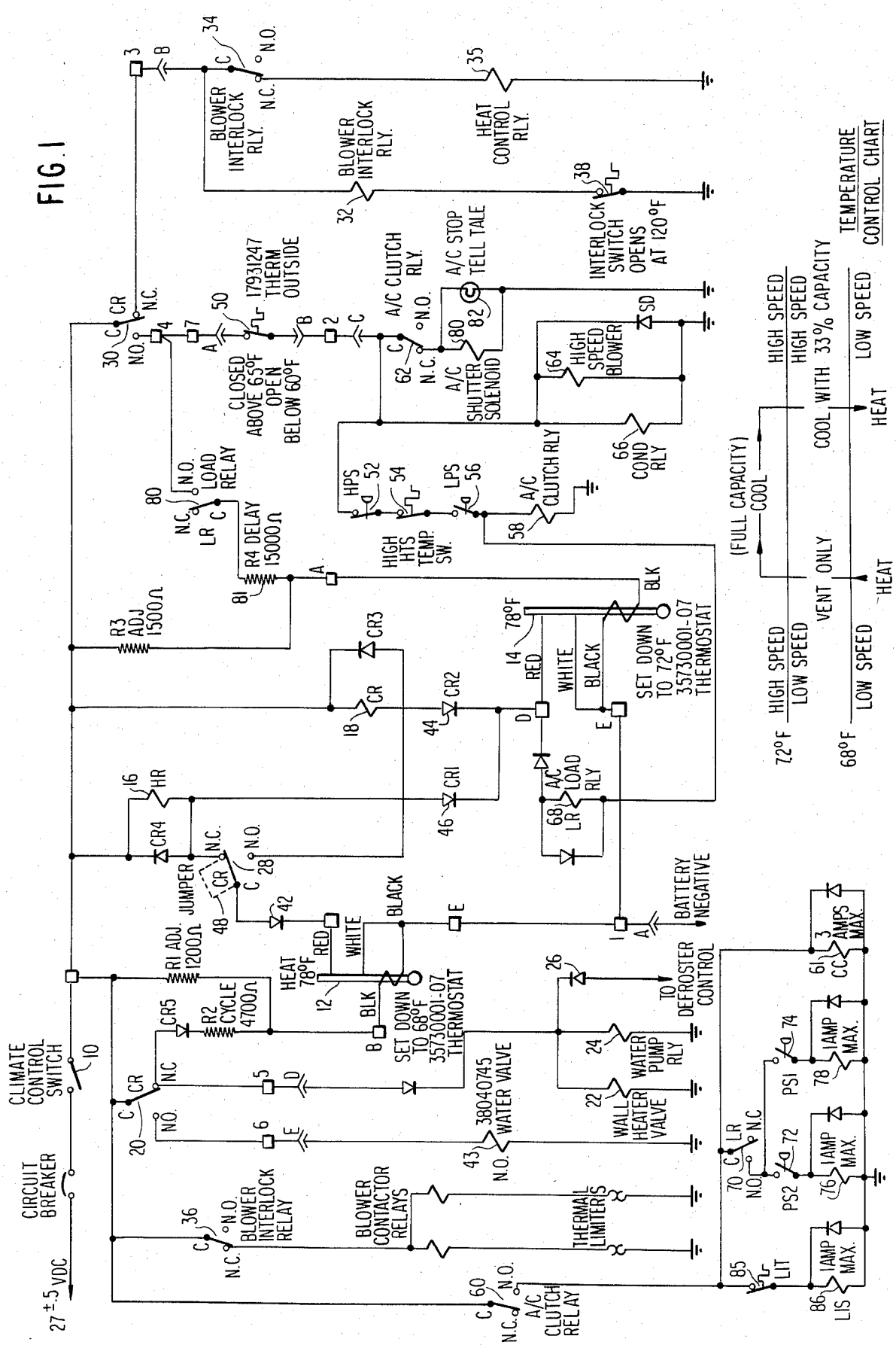
FIG. 1 is a schematic diagram of essential components of a control system according to the present invention.

A first embodiment of the invention will now be described with reference to FIG. 1, which is a schematic diagram of essential components of an air conditioning control system according to the present invention.

The construction and operation of the system of FIG. 1 may be briefly described as follows.

The system includes a two-position (on-off) climate control switch 10 which must be on (closed) for the system to be operative. Assuming the switch 10 is closed, power is provided through resistor R1 to a heat control thermostat 12 and through resistor R3 to a cooling control thermostat 14. Thermostats 12 and 14 may be identical thermostats with their set points adjustable through adjustment resistors R1 and R3. The set points of the thermostats 12 and 14 are assumed to be 68° F. and 72° F., respectively, for purposes of the following description. The thermostats are such that a connection will be established between their red and white wires, i.e. the thermostats will be closed, only when their respective set point temperatures are exceeded.

Assuming the return air temperature to be below 68° F., both thermostats 12 and 14 will be open. Under this condition, the heating relay (HR) coil 16 and cooling relay (CR) coil 18 are both de-energized. The CR coil 18 controls two sets of switch contacts 28 and 30 which, when the CR coil 18 is de-energized, will each connect their common (C) terminal to the respective normally closed (NC) terminal. The HR coil 16 controls at least one set 20 of switch contacts 20 which will be switched to the NC position upon energization of the coil 16. In this condition, the sidewall heater valve solenoid 22 and water pump relay coil 24 will be energized, and the blower interlock relay coil 32 will also be energized to switch contacts 34 to their NC position to energize a main heat control relay coil 35. Energization of coil 32 will cause switch contacts 36 to switch to their NC position, so that the heating system will now be in operation with the blower operating at low speed.

It should also be noted that the sidewall heater and water pump relay coils 22 and 24 can be energized through diode 26 by defroster control circuitry (not shown) even when the temperature is above 68° F. and the heat thermostat is open. Further, it should be noted that an interlock switch 38 is provided in series with the blower interlock relay coil 32, to de-energize disable the blower interlock relay coil 32 and disable the blower when the blower temperature exceeds 120° F.

When the return air temperature rises above 68° F., the thermostat 12 will close to energize HR coil 16 through diode 42. This will cause contacts 20 to switch to their NO position to energize a normally open water valve 43 and shut off the supply of water to the heater coil. The low speed heater fan will remain in operation due to continued energization of the blower interlock relay coil 32, so that the system will now operate in a venting mode.

If the return air temperature rises above 72° F., the cooling thermostat 14 will close. This will energize CR 18 through diode 44 and cause switch contacts 28 and 30 to switch to their NO positions. Switching of the contacts 28 to their NO position will not de-energize HR coil 16, since the coil 16 will remain energized through the thermostat 14 via diode 46 as well as through the thermostat 12 via diode 42 and the jumper 48 connecting the C and NC contacts of switch 28.

Switching of contacts 30 to their NO position will de-energize the low speed blower interlock relay and will enable the cooling system. An outside air temperature thermostat 50 is provided with a hysteresis operating characteristic in a known manner to close at 65° in response to a rising temperature and open at 60° in response to a falling temperature. Assuming the thermostat 50 to be closed, power will be provided through switches 52, 54 and 56 to energize A/C clutch relay coil 58. This will result in both sets of switch contacts 60 and 62 switching to their NO positions. With the switch contacts 60 in their NO position, the clutch coil 61 will be energized and the compressor will be activated. With high speed blower relay coil 64 and condenser relay coil 66 also energized, the air conditioning system will now operate in a cooling mode at high speed.

Simultaneously with energization of the A/C clutch relay coil 58, power is provided to a compressor load relay (LR) coil 68 which will be energized due to the closed state of the themostat 14. With LR coil 68 energized, the switch contacts 70 will be switched to their NO position to permit variable loading of the compressor as follows. Assuming for the moment that both switches 72 and 74 are closed, both load control coils 76 and 78 are energized and the compressor will operate at 100% load. As long as the thermostat 14 remains closed and all other operating conditions remain normal, the compressor load will be determined by the evaporator pressure. As engine speed increases, the evaporator pressure will decrease and the pressure detection switch 72 will open, thus de-energizing coil 76 so that the compressor will operate at 66% loading. As engine speed continues to increase and the evaporator pressure continues to drop, pressure switch 74 will open and coil 78 will be de-energized, so that the compressor will now operate at 33% loading.

If at any time the compressor discharge pressure becomes excessively high, switch 52 will open. An excessively low suction pressure will open switch 56. Excessively high compressor discharge temperature will open switch 54. The opening of any of these switches will de-energize the A/C clutch relay coil 58 and disable the compressor by switching contacts 60 to their NC position. Contacts 62 would simultaneously be switched to their NC position to energize solenoid 80 to close the return air duct and to also activate an indicator 82, e.g. a lamp, to indicate to the operator that the air conditioning system has been shut down for safety reasons.

It should also be noted that a detected high temperature compressor discharge, somewhat lower than the temperature detected by the switch 54, will result in closing of the switch 84 to energize liquid injection solenoid coil 86 to thereby inject liquid refringement into the compressor for cooling purposes.

Assuming that the system continues to operate normally at a capacity determined by the pressure switchs 72 and 74, the temperature will eventually fall. When it falls below 72° F., the thermostat 14 will open. The opening of thermostat 14 will not de-energize the CR coil 18, since the CR coil 18 will continue to be energized through the closed thermostat 12, diode 42 and switch contacts 28 in their NO position. Thus, the compressor will continue to operate. However, opening of the thermostat 14 will de-energize the LR coil 68 to thereby change switch contacts 70 to their NC position, disabling both coils 76 and 78 and fixing the compressor at a 33% loading regardless of the status of the pressure switches 72 and 74. The HR coil 16 remains energized and the heating system remains disabled due to the jumper 48 connected across the switch 28.

As the temperature continues to fall, thermostat 12 will open at 68° F., de-energizing the HR coil 16 and CR coil 18. HR coil relay contacts 20 and CR contacts 28 and 30 will all switch to their NC positions, enabling the low speed blower and heater and disabling the compressor and related cooling devices.

At this time, the heating system will again be activated. However, the cycling resistor R2 connected in series with the power supply to the thermostat 12 is typically provided for the purpose of warming up the thermostat 12 to cause it to close quickly after it has opened at 68° F., thus the term "cycling" resistor." This will cause the heat to shut off with very little temperature rise actually occurring. Accordingly, the heating system will remain activated only momentarily, after which the thermostat will again close to implement the venting or deadband mode of system operation.

In order to decrease the on/off cycle time of the compressor, an additional set of switch contacts 80 can be provided for operation by the LR relay coil 68. Upon initial energization of the compressor at full load, the resistor 81 can be energized to only slightly raise the temperature of the thermostat 14, e.g. approximately 1° F. This will cause the compressor to operate at full load down to approximately 71° F., which will in turn increase the unloaded time of the compressor, thus decreasing the rate of cycling of the unloader. It should be noted that the switch contacts 80 and resistor 81 need only be provided if the normal thermal lag in the thermostat 14 does not provide sufficient unloaded time.

Figure 2:
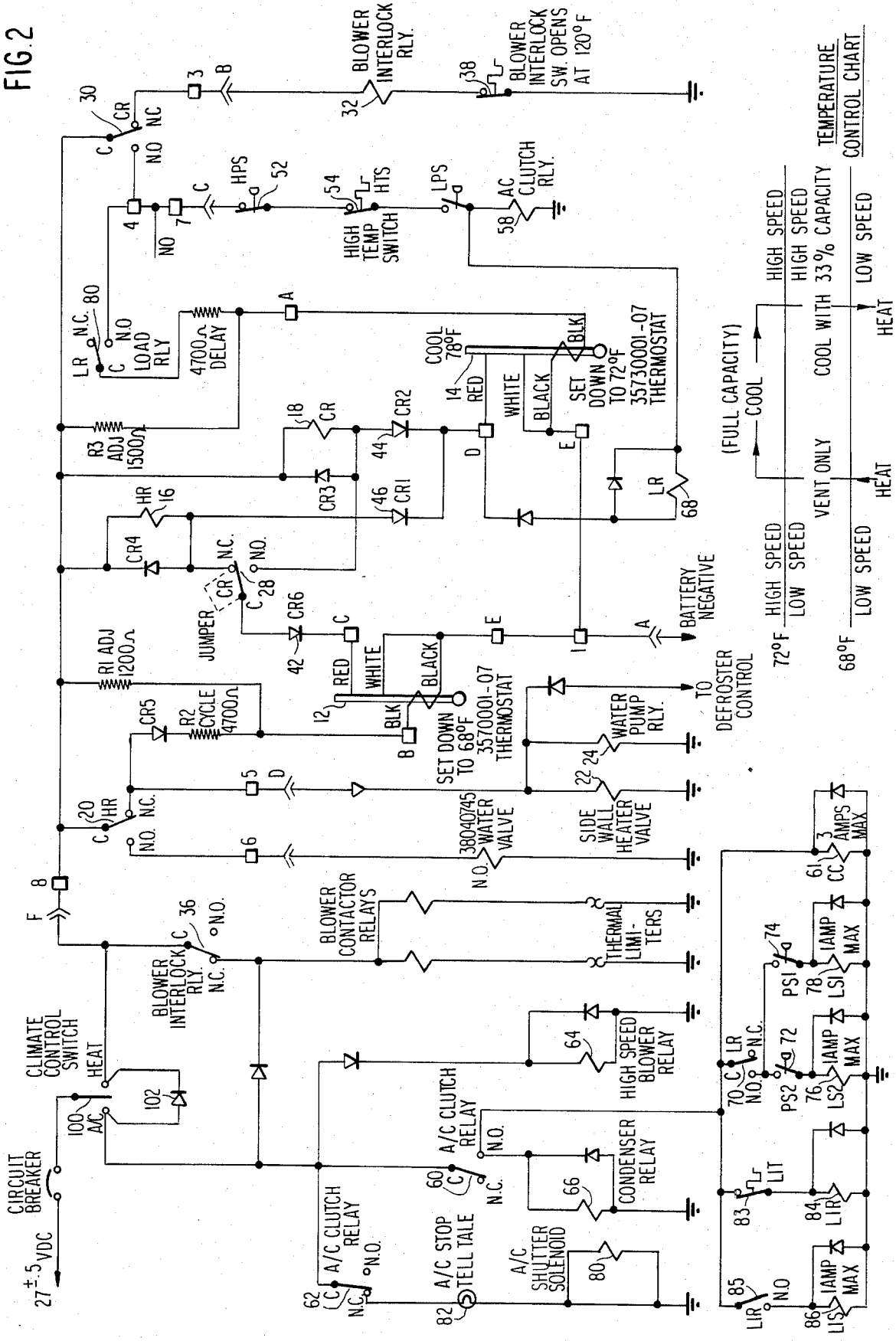
FIG. 2 is a schematic diagram similar to that of FIG. 1 except for a control system employing a 3-position climate control switch rather than the on/off climate control switch of FIG. 1.

A variation of the system illustrated in FIG. 1 is shown in schematic form in FIG. 2. The essential difference between the systems of FIGS. 1 and 2 is that the control system of FIG. 2 employs a three-position switch 100 in place of the on/off climate control switch 10 in FIG. 1. In the center position of the switch 100, neither the cooling nor heating system are enabled. In the left-hand position labelled "A/C", the system operates as a combined heating/air conditioning system, and in the right-hand position labelled "heat", the cooling system cannot be energized. The operation in a "heat only" mode is made possible by providing a diode 102 across the A/C and heat terminals of switch 100 and by coupling essential components of the cooling system to the anode side of the diode 102. Most notably, the compressor clutch coil 61, the compressor loading control circuitry 70-78, the high speed blower relay 64 and condensor relay 66 cannot receive power when the switch 100 is in its "heat" position, even though the thermostat 14, load relay 68 and other compressor-related circuit components may be operable.

The operation of the circuitry of FIG. 2 is otherwise substantially similar to that of FIG. 1. In the A/C position of switch 100, and with both thermostats 12 and 14 open below 68° F., the HR coil 16 and CR coil 18 are both de-energized and contacts 20, 28 and 30 are all at their NC positions. The heating system is thus enabled. When the temperature rises above 68° F., the thermostat 12 closes to energize HR coil 16 and change switch contacts 20 to their NO position to disable the heater while blower interlock relay contacts 36 remain in their NC position to continue operation of the low speed blower. When the temperature rises above 72° F., thermostat 14 closes to energize CR coil 18 and thereby change switch contacts 28, 30 to their NO positions. LR coil 68 is energized so that the compressor is capable of full load operation, with the load level being variable in accordance with the status of evaporator pressure switches 72 and 74.

When the return air temperature falls below 72° F., the thermostat 14 will open to de-energize the LR coil 68 and fix the compressor load level at 33%. The compressor will continue operating due to the energization of coil CR 18 through switch 28, diode 42 and the closed thermostat 12. Finally, when the temperature drops below 68° F., the thermostat 12 will open to de-energize both of coils 16 and 18, thereby disabling the compressor and activating the heating system.

In either of the systems of FIGS. 1 or 2, the essential operating features are the same, i.e., in the cooling mode of operation, the compressor is operated at variable capacity down to some predetermined temperature, after which the compressor load level is fixed at 33%. The 33% loading continues down to the lower set point temperature at which the compressor is deactivated entirely and the heating system is turned on. The compressor will now be reactivated until the temperature rises to the upper set point.

Figure 3:
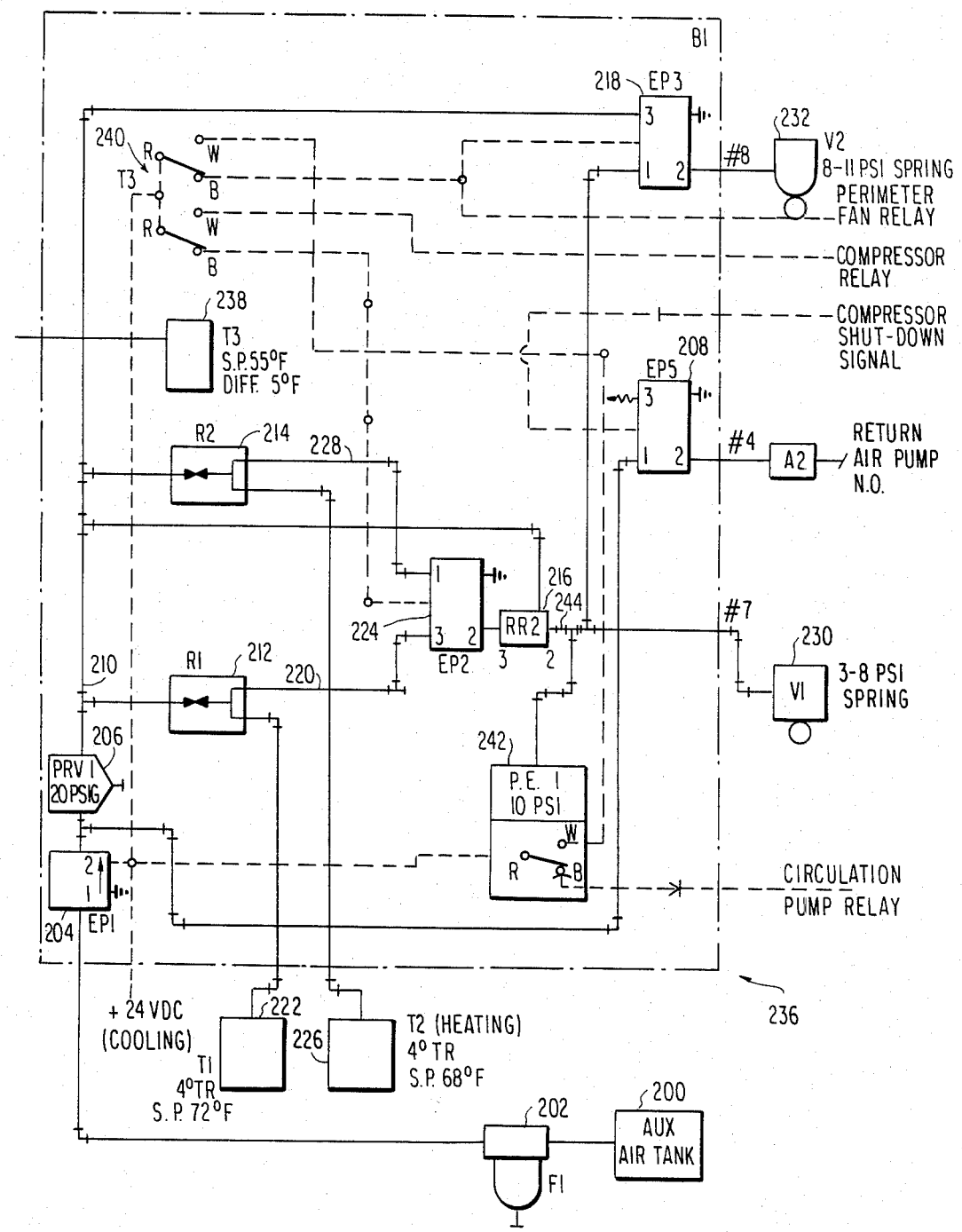
FIG. 3 is a partial system diagram for a pneumatic control system employing the present invention.
Figure 4A:
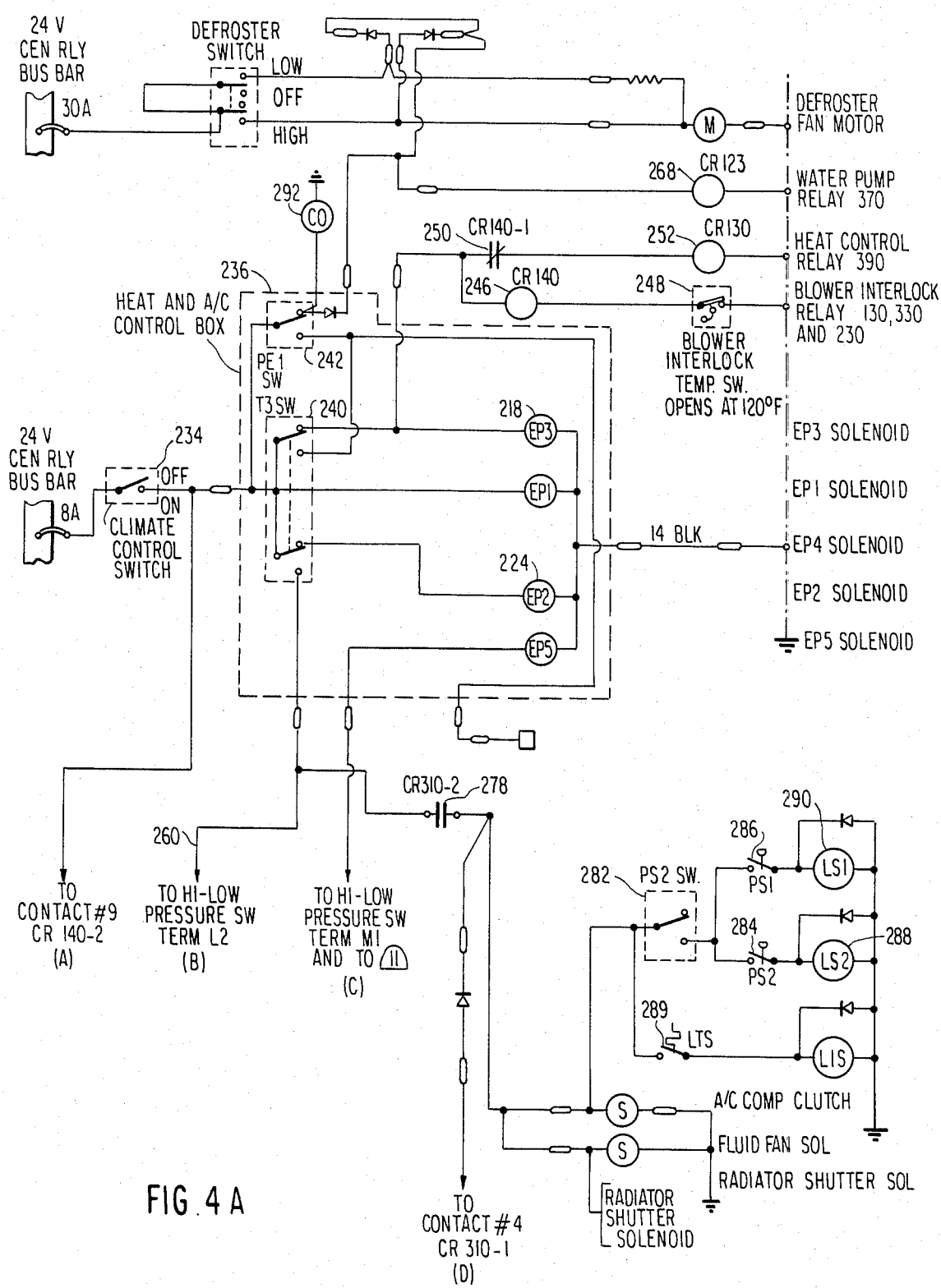
FIGS. 4A and 4B are schematic diagrams of the control circuitry for the pneumatic control system illustrated in FIG. 3.
Figure 4B:
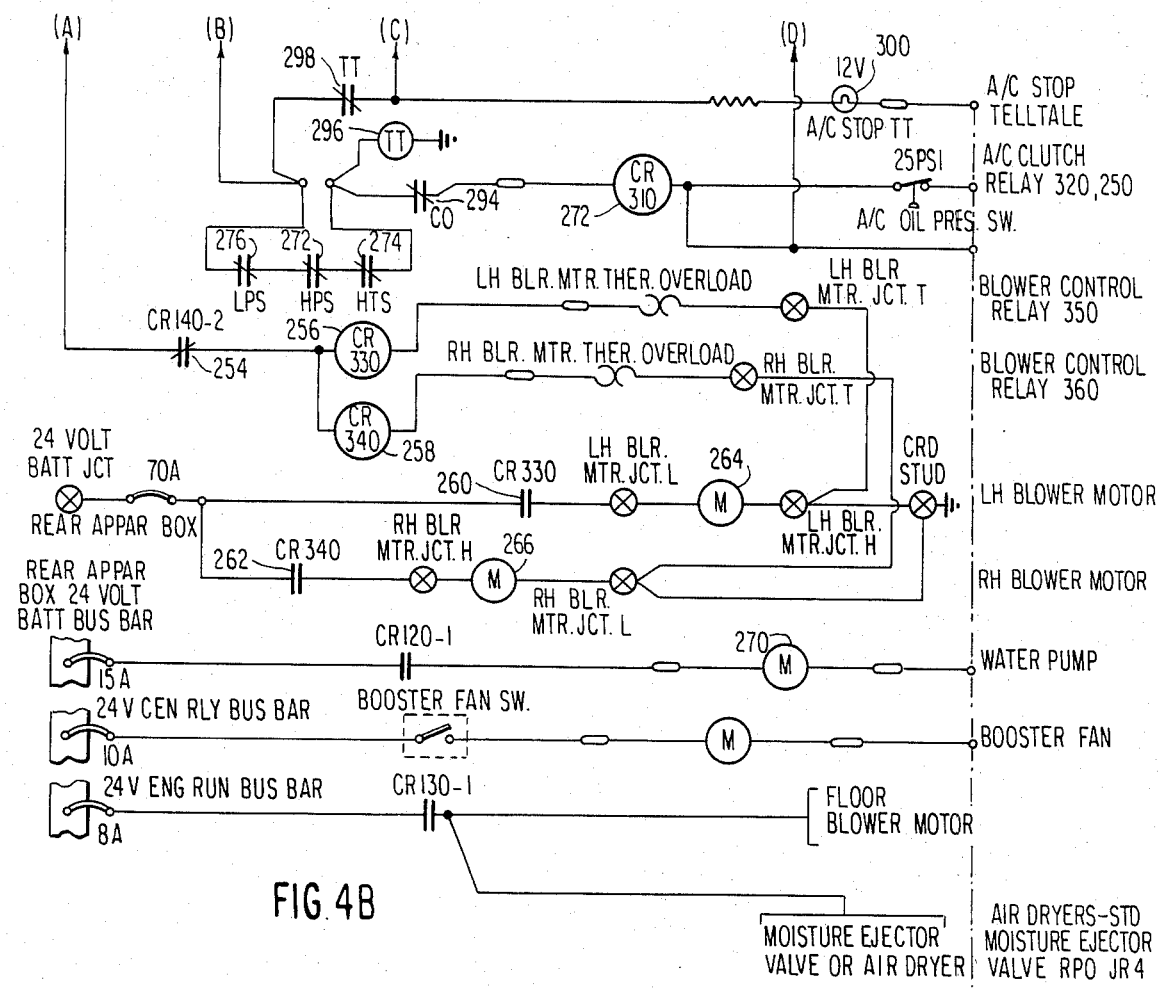

FIGS. 1 and 2 illustrate control systems which are entirely electric, but there are a substantial number of air conditioning control systems currently in use which employ a pneumatic control system. FIG. 3 is a pneumatic circuit diagram of such a system, and FIGS. 4A and 4B are schematic diagrams of the control circuitry which operates in conjunction with the pneumatic system partially shown in FIG. 3. The operation of the system illustrated in FIGS. 3, 4A and 4B is substantially similar to that of FIGS. 1 and 2, with the essential distinction being that some of the control functions are implemented pneumatically rather than electrically.

Referring first to FIG. 3, the pneumatic circuit will be briefly described. An auxiliary air tank 200 provides air through a filter 202 at a relatively high pressure to a solenoid valve 204. The solenoid valve 204 is normally closed but, when energized by a 24 volt D.C. source, connects its ports #1 and #2, thereby coupling air pressure to a pressure regulator 206 while also providing the unregulated high pressure to a solenoid valve 208, to be described later.

The pressure regulator 206 provides a regulated 20 PSIG pressure on line 210 to each of two restrictors 212 and 214. The regulated pressure is also provided as a reference signal to pressure amplifier 216 and to solenoid valve 218.

The restrictor 212 bleeds the regulated pressure onto line 220 at a fixed rate, and thermostat 222 vents the line 220 at a rate which is inversely proportional to temperature. Thus, at increasing temperatures, the bleed rate of thermostat 222 will be reduced, thereby increasing the pressure on line 220, with the pressure signal on line 220 being provided as one input to solenoid valve 224. Similarly, the thermostat 226 causes the pressure on line 228 to rise with increasing temperature, with the pressure signal on line 228 being provided as a second input to the solenoid valve 224.

Valves 230 and 232 are spring-loaded control valves, with the valve 230 comprising the main water modulation valve for controlling the supply of hot water to the heating coil, and valve 232 comprising a sidewall or floor discharge heater valve for controlling the supply of hot water to these auxiliary heaters.

The operation of the pneumatic system of FIG. 3 will be explained with reference to that Figure as well as to the schematic diagram of FIGS. 4A and 4B.

With the climate control switch 234 (FIG. 4A) in its off position, there is no power source provided to the control box 236, and neither the heating system nor the air conditioning system are operable. With the control switch 234 in its on position, an outside air temperature sensor 238 determines whether the system is operating in the heating mode or the air conditioning mode. Whenever the outside air temperature falls below some predetermined level, e.g. 65° F., the thermostat 238 causes switch contacts 240 to switch to their "B" positions. This provides 24-volt power to the solenoid 218 and 244 while also providing power through blower interlock relay coil 246 to interlock temperature switch 248, and through blower interlock relay switch contacts 250 to heat control relay coil 252, all performing functions similar to their counterparts 32, 33, 34 and 35 in the system of FIG. 1. Energization of the blower interlock relay activates the perimeter fans, e.g. the sidewall and floor discharge fans. This is accomplished by closing switch contacts 354 (FIG. 4B) which correspond to the switch contacts 36 in FIG. 1. Relays 256 and 258 are then energized to close switch contact 260 and 262, respectively, activating the blower motors 264 and 266. A pressure-activated water circulator pump switch 242, provides power to a circulation pump relay. Switch 242 makes contact between its R and B terminals at 12 PSI for rising pressures, and makes contact between its R and W terminals at 10 PSI for falling pressures.

When energized, the solenoid valves 204, 208, 218 and 224 all connect their #1 and #2 ports. Thus, when the switch 240 provides power to its B output terminals, the pressure signal on line 228 is provided to pressure amplifier 216 which then provides on line 244 a pressure signal proportional to the temperature monitored by heating thermostat 266. This pressure signal on line 244 will be provided to the valve 230 and will also be provided through solenoid valve 218 to the sidewall heater valve 232.

At low interior temperatures, the pressure signal on line 234 will remain low, and both of the main and sidewall heater valves will be fully open. As the interior temperature increases, the return air thermostat 226 will gradually close to cause a gradual build-up of air pressure on the line 228. The corresponding increase in pressure on line 244 will gradually close the main modulation valve 230, with the valve 230 becoming fully closed, e.g. at 8 PSI. In the preferred embodiment, a pressure of 8 PSI on line 244 will correspond to the set point of the return air thermostat 226, e.g. 68° F.

As the interior temperature continues to rise, the pressure on line 244 will further increase and will begin gradually closing the sidewall heater valve 232. The sidewall heater valve will be fully closed at some higher pressure, e.g. 10 PSI. In the preferred embodiment, the valve 232 will become fully closed at a temperature of approximately 69.2° F.

When both valves 230 and 232 are fully closed and the pressure at the control input to the switch 242 is 10 PSI, the switch 242 connects its common terminal R to its output terminal W, thus de-energizing the water pump relay 268 and turning off the water pump motor 270 (FIG. 4B).

If the outside air temperature is sufficiently high to warrant operation of the air conditioning system, the outside air thermostat 238 will connect the common terminals R to output terminals W in switch 240. This removes power from the solenoid valves 218 and 244, so that they now connect their #3 and #2 ports. The solenoid valve 218 will therefore provide the regulated 20 PSI signal to the valve 232 to maintain that valve fully closed, and the pressure on line 244 will now be proportional to the temperature monitored by the cooling mode return air thermostat 222. Power is provided to the compressor relay coil 272 through normally-closed switch contacts 272, 274 and 276 operating in an identical manner to switches 52, 54 and 56 in FIGS. 1 and 2. Energizing relay coil 272 will close contacts 278 and provide power to the compressor clutch 280 as well as to the load control circuitry.

At high return air temperatures, the pressure on line 244 will be relatively high, thus maintaining the valve 230 fully closed and controlling the switch 242 to keep the circulation pump relay de-energized. The pressure switch 282, which is similar to pressure electric switch 242 but has upper and lower control pressures of 10 PSI and 8 PSI, maintains its common terminal R connected to its W output terminal so that loading of the compressor can be varied in accordance with evaporator pressure as determined by switches 284 and 286 in a manner identical to that implemented in the systems of FIGS. 1 and 2.

As the interior temperature falls, the pressure on line 244 will continue to fall, and at 10 PSI the switch 282 switches to its B output and disables both solenoids 288 and 290, thereby fixing the compressor loading at 33%. As the pressure on line 244 continues to drop, at 8 PSI the switch 242 switches to its B position, thereby energizing the water circulation pump while simultaneously energizing a relay coil 292 (FIG. 4A). Energization of the relay coil 292 opens normally-closed contacts 294 (FIG. 4B) and removes power from the compressor.

At this point, the valve 230 remains fully closed, so that the heating system is ready for operation but is not operating, and the compressor is turned off. A further drop in the return air temperature will open valve 230 in proportion to the temperature, thus heating the bus.

If at any time during the cooling mode of operation, any one of the switches 272, 274 or 276 opens, the relay coil 296 will be de-energized to close the normally-open contacts 298 and illuminate the indicating lamp 300 which performs a function similar to the indicating lamp 82 in FIGS. 1 and 2.

Upon a subsequent rise in the return air temperature, the compressor will not be restarted until 10 PSI at which the switch 242 turns on the heating pump circulator. The compressor will be allowed to reload to 100% at 12 PSI by means of the switch 282.

The system described above with reference to FIGS. 3, 4A and 4B represents a significant improvement in pneumatic-control type air conditioning systems. In conventional such systems, the compressor has been operated whenever dictated by the outside air temperature thermostat 238, which has been typically set between 45° F. and 55° F. Obviously, this has resulted in significant unnecessary compressor operation and consequent unnecessary fuel consumption. With the combination of evaporator pressure control and internal bus temperature control for loading and unloading of the compressor, the system according to the present invention achieves minimal fuel consumption in that no engine heat must be used for climate control purposes, and the refrigeration system need therefore only remove from the bus the heat commensurate with the true load.

Figure 5:
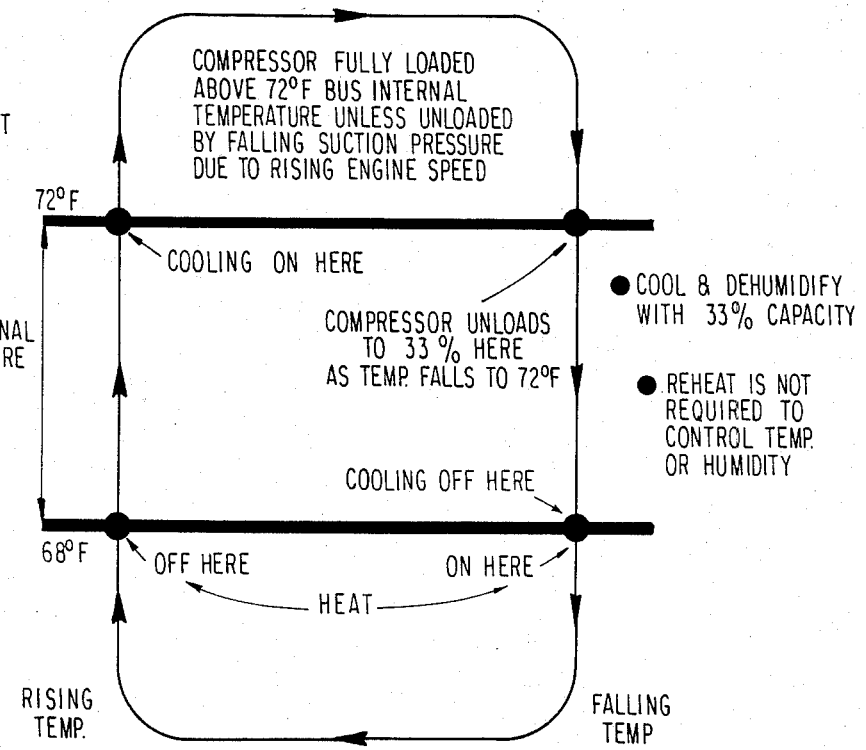
FIG. 5 is a temperature control chart illustrating the operating sequence implemented by the control system according to the present invention.

Thus, conventional reheat-type systems control humidity and avoid excessive clutch cycling but waste large amounts of fuel, and on-off systems save fuel but impose excessive clutch cycling and do not control humidity. In contrast, the control sequence implemented by the control system according to the present invention is illustrated in FIG. 5. As described above and as emphasized in FIG. 5, the system according to the present invention saves fuel by not using reheat, and excessive clutch cycling is also avoided by partially unloading the compressor in accordance with bus internal temperature, in contrast to some conventional systems which constantly turn the compressor on and off in accordance with the bus internal temperature. Further, the system according to the present invention controls humidity by maintaining the compressor at a partial load, e.g. 33% load, when the bus internal temperature is moderate, whereas some other systems would merely turn off at moderate temperatures and thus lose humidity control. Further, the control system according to the present invention also permits unloading of the compressor due to rising engine speed, and the compressor also unloads and cannot reload if the bus internal temperature remains moderate.

The systems described above are largely conventional systems improved to incorporate the features of the present invention. The system operation has been described insofar as is necessary for a proper understanding of the invention, and the remaining aspects of system operation will be well-known to those skilled in art and familiar with conventional bus air conditioning systems.

Further, while specific embodiments have been described above, it will be appreciated that various changes and modifications can be made to the disclosed systems without departing from the spirit and scope of the invention as defined in the appended claims.

I claim:

1. A control apparatus for a climate control system for controlling the temperature of air in a controlled area, said system including a compressor operable at a plurality of different load levels and said system being capable of at least a cooling mode wherein said compressor is activated to reduce said air temperature, said control system comprising:
   temperature sensing means for monitoring said air temperature;
   further sensing means for sensing at least one operating parameter of said climate control system other than said air temperature; and
   control means for varying the load level of said compressor above a first predetermined air temperature in accordance with said operating parameter, and for fixing the load level of said compressor at a predetermined load level below said first predetermined temperature regardless of the value of said sensed parameter.

2. A control apparatus as defined in claim 1, wherein said predetermined load level is the lowest nonzero load level of said plurality of load levels.

3. A control apparatus as defined in claim 1, wherein said at least one operating parameter comprises the operating speed of said compressor.

4. A control apparatus as defined in claim 1, wherein said climate control system includes an evaporator coupled to said compressor and over which said air is passed to remove heat from said air while evaporating a working fluid, said at least one parameter comprising the pressure of said working fluid at said evaporator.

5. A control apparatus as defined in claim 1, wherein said control means further deactivates said compressor when said air temperature falls below a second predetermined temperature lower than said first predetermined temperature.

6. A control apparatus as defined in claim 4, wherein said control means further deactivates said compressor when said air temperature falls below a second predetermined temperature lower than said first predetermined temperature.

7. A control apparatus as defined in claim 5, wherein said system further includes heating means and is capable of a heating mode in which said heating means is activated to raise said air temperature, said control means including means for activating said heating means only below said second predetermined temperature and for deactivating said heating means whenever said air temperature rises above said second predetermined temperature.

8. A control apparatus as defined in claim 7, wherein said control means comprises:
   a first thermostat having a first state above said first predetermined temperature and a second state below said first predetermined temperature;
   a second thermostat having a first state above said second predetermined temperature and a second state below said second predetermined temperature; and
   mode control means for activating said heating means only in response to said second state of said second thermostat, for activating said compressor in response to a transition of said first thermostat from said second state to said first state, and for deactivating said compressor in response to a transition of said second thermostat from said first state to said second state.

9. A control apparatus as defined in claim 8, wherein said first and second states of said thermostats are conductive and non-conductive states, respectively, and wherein said mode control means includes:
- a first coil connected in series with said second thermostat to be energized and de-energized in said first and second states, respectively, of said second thermostat, said heating means being activated when said first coil is de-energized;
- a second coil connected in series with said first thermostat and being energized and de-energized in said first and second states, respectively, of said first thermostat, said compressor being activated when said second coil is energized; and
- switch means (28) for connecting said second coil (18) in series with said second thermostat (12) in response to energization of said second coil and for disconnecting said second coil from said second thermostat in response to de-energization of said second coil.

10. A control apparatus as defined in claim 8, wherein said control means further includes load control means for permitting variation of said compressor load in response to said first state of said first thermostat and for fixing said compressor load at said predetermined load level in response to said second state of said first thermostat.

11. A control apparatus as defined in claim 5, wherein said control system is a pneumatic control system of the type generating pressure signals corresponding to said air temperature, said control means comprising at least a first pressure-responsive switch (242) having a first stage for activating said compressor and a second state for deactivating said compressor, said first pressure-responsive switch switching from said second state to said first state when said pressure signal rises above a first level and switching from said first state to said second state when said pressure signal falls below a second level lower than said first level.

12. A control apparatus as defined in claim 11, wherein said control means further includes a second pressure-responsive switch having a first state for enabling variable loading of said compressor and a second state for fixing said compressor load at said predetermined load level, said second pressure-responsive switch switching from said first state to said second state when said pressure signal falls below said first level and switching from said second state to said first state when said pressure signal rises above a third level higher than said first level.

* * * * *